(Model.)
J. A. MORSMAN.
Sulky Plow.
No. 239,530.    Patented March 29, 1881.
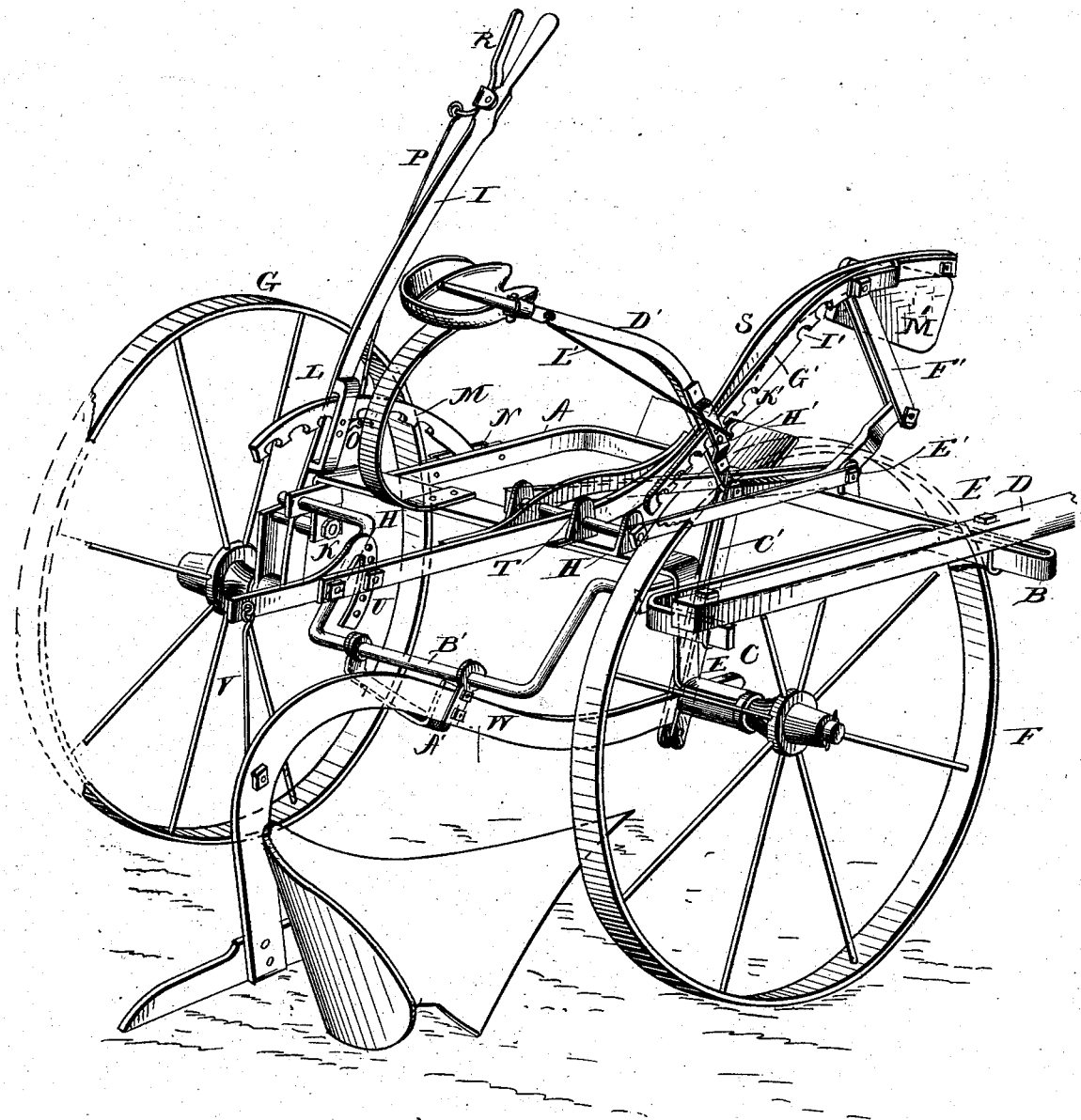

United States Patent Office.

JOHN A. MORSMAN, OF CENTRALIA, ILLINOIS.

SULKY-PLOW.

SPECIFICATION forming part of Letters Patent No. 239,530, dated March 29, 1881.

Application filed January 4, 1881. (Model.)

*To all whom it may concern:*

Be it known that I, JOHN A. MORSMAN, of Centralia, in the county of Marion, and in the State of Illinois, have invented certain new and useful Improvements in Sulky-Plows; and I do hereby declare that the following is a full, clear, and exact description of the invention, reference being had to the accompanying drawing, and to the letters of reference marked thereon, making a part of this specification.

This invention relates to certain improvements in sulky-plows; and it has for its objects to provide certain means whereby one wheel of the plow may run in the furrow and the plow at the same time be kept level, to provide certain means for adjustably attaching the tongue to the frame, and to provide for balancing the plow, as more fully hereinafter specified. These objects I attain by the apparatus illustrated in the accompanying drawing, which represents a perspective view, showing my improved plow complete.

The letter A indicates the main frame of the plow, which is constructed of bar metal bent into an approximately rectangular shape, as indicated. At one side of said frame are formed extensions B and C by bending the metal, which extensions serve as a seat for the tongue D, which is secured to such extensions by means of the hooked bolts E.

The letters F G indicate the wheels upon which the plow is mounted. These wheels are of unequal diameter, so that one wheel can run in the furrow formed by the plowshare, and the level of the machine may at the same time be maintained. The axle of the larger wheel is rigidly secured to one end of a bent transverse bar, H, which is secured to the main frame by means of bolts or otherwise. The axle of the other wheel is secured to the lower end of a lever, I, which is fulcrumed at K to the transverse bar H. The said lever is slotted, as indicated by the letter L, through which slot passes a toothed segment, M, which is pivoted at N to the main frame. The lever is provided with a dog or pawl, O, which is adapted to engage the teeth of the segment, whereby the lever may be adjusted to elevate or depress the frame at one side, the said dog or pawl being connected by means of a rod, P, with a hand-lever, R, by which it may be operated.

The letter S indicates a lever fulcrumed at T to the transverse bar H, which is connected at its rear end by means of an adjustable segment, U, with a link, V, which connects with the plow-beam W. The said plow-beam is supported by a frame, A', swiveled to a frame, B', secured to the main frame. The forward end of the plow-beam connects, by means of a link, C', with a lever, D', fulcrumed at E' to the main frame. The said lever, at its forward end, is connected to the curved lever S by means of links F', and at its rear extends backward, so as to be within convenient reach of the driver.

The letter G' indicates a curved arm, pivoted to the forward end of the lever S, and extending through a slot, H', in the lever D'. The said arm is provided with recesses I' at its lower edge, with which a pin in said lever is adapted to engage, and is released by a pawl or dog, K', which is operated by means of a rod and lever, L', whereby the plow-beam may be elevated or depressed and held in any desired position. The forward end of the lever S is provided with a weight or counterpoise, M', to counterbalance the weight of the plowshare and permit its position to be shifted conveniently.

In raising the plow from the ground it will be perceived that owing to the peculiar system of levers the forward end of the plow-beam will be lifted in advance of the rear end, thus elevating the point of the plowshare before it is withdrawn from the ground, materially assisting the operation of withdrawal.

Having thus fully described my invention, what I claim, and desire to secure by Letters Patent, is—

1. The combination, in a sulky-plow, of the plow-beam, with the frame A' and link C' for supporting it, the lever D', connecting with said link and fulcrumed upon the main frame, the link F', connecting with the forward end of said lever, which is extended in advance of its fulcrum, and the counter-balance M', said members being constructed and adapted for operation substantially as described.

2. The combination, in a sulky-plow, of the plow-beam, supported at a point between its forward end and the plowshare, with the pivoted lever D', fulcrumed upon the main frame, a link connecting said lever with the forward end of the plow-beam, a notched arm, G', connected with the forward end of the lever by a link, the pawl K', for engaging the notches of said arm, and the counter-balance M', all constructed substantially as described.

3. The combination, in a sulky-plow, of the main frame with the pivoted lever S, the rod or link V, connecting the rear end of said lever with the plow-beam, the counter-balance M' at the forward end of the lever, the notched arm G', the lever D', carrying a pawl adapted to engage the notches of said notched arm, the link F', the forward end of the lever D', with the lever S and with the notched arm, and a link connecting the lever carrying the pawl with the forward end of the plow-beam, substantially as described.

4. The combination, in a sulky-plow, of the frame A and the cross-bar H with the plow-beam W, its supporting-frame A', hung upon the swinging frame B', the rod or link V, the adjustable segment U, pivoted lever S, link F', notched arm G', pivoted lever D', carrying a pawl, K, the counter-balance M', and the link C', connecting the lever carrying the pawl with the forward end of the plow-beam, said members being constructed and organized for operation substantially as described.

In testimony that I claim the foregoing I have hereunto set my hand this 20th day of December, 1880.

JOHN A. MORSMAN.

Witnesses:
 JAMES SWATMAN,
 JAS. B. SANDERS.